United States Patent
Foltin

(10) Patent No.: US 9,381,852 B2
(45) Date of Patent: Jul. 5, 2016

(54) METHOD AND CONTROL UNIT FOR TRANSMITTING DATA ON A CURRENT VEHICLE ENVIRONMENT TO A HEADLIGHT CONTROL UNIT OF A VEHICLE

(75) Inventor: Johannes Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 338 days.

(21) Appl. No.: 14/008,948

(22) PCT Filed: Mar. 22, 2012

(86) PCT No.: PCT/EP2012/055092
§ 371 (c)(1),
(2), (4) Date: Mar. 31, 2014

(87) PCT Pub. No.: WO2012/130719
PCT Pub. Date: Oct. 4, 2012

(65) Prior Publication Data
US 2014/0219506 A1    Aug. 7, 2014

(30) Foreign Application Priority Data
Mar. 31, 2011   (DE) .......................... 10 2011 006 570

(51) Int. Cl.
G06K 9/00    (2006.01)
B60Q 1/14    (2006.01)

(52) U.S. Cl.
CPC ............ *B60Q 1/143* (2013.01); *G06K 9/00825* (2013.01); *B60Q 2300/056* (2013.01); *B60Q 2300/41* (2013.01); *B60Q 2300/42* (2013.01)

(58) Field of Classification Search
USPC ....................................................... 382/104
See application file for complete search history.

(56) References Cited

U.S. PATENT DOCUMENTS

2006/0125919 A1* 6/2006 Camilleri ................. B60R 1/00
                                                     348/148
2007/0263901 A1 11/2007 Wu et al.
(Continued)

FOREIGN PATENT DOCUMENTS

DE   10 2007 041 784   2/2010
EP        1 962 226    8/2008
EP        2 166 489    3/2010

OTHER PUBLICATIONS

International Search Report, PCT International Application No. PCT/EP2012/055092, dated Jul. 3, 2012.
(Continued)

*Primary Examiner* — Yon Couso
(74) *Attorney, Agent, or Firm* — Norton Rose Fulbright US LLP

(57) ABSTRACT

A method for transmitting data on a current vehicle environment to a headlight control unit of a vehicle. In this context, the data were taken using a camera, a plausibility check being able to take place via an additional sensor system. The method includes a step of reading in object data concerning at least two objects; the object data representing information on objects, which have been classified in an image taken by the camera as an object. Furthermore, the method includes a step for forming object group data from the read-in object data of the at least two objects, the forming taking place while using at least two different parameters, which were provided from image data of the image taken by the camera. Finally, the method includes a step of transmitting the object group data as data on a current vehicle environment to the headlight control unit.

14 Claims, 6 Drawing Sheets

(56) References Cited

U.S. PATENT DOCUMENTS

2008/0043099 A1* 2/2008 Stein .................. B60Q 1/143
348/118
2012/0072080 A1* 3/2012 Jeromin ............ G06K 9/00798
701/49

OTHER PUBLICATIONS

Rebut, "A Monocular Vision Based Advanced Lighting Automation System for Driving Assistance", *IEEE International Symposium on Industrial Electronics*, 2009.

Hermann Winner et al., Handbook on Driver Assistance Systems, Jan. 1, 2009, pp. 84-92 with partial English translation.
http://de.wikipedia.org/wiki/Optischer_Fluss; Sep. 13, 2013.
Alcantarilla et al., "Automatic LightBeam Controller for Driver Assistance", Machine Vision and Applications, Mar. 27, 2011, pp. 819-835.
Winner et al., "Driver Assistance System Manual", Vieweg + Teubner, 2009, Chapters 9, 15, 17 and 30, 76 pages.

* cited by examiner

METHOD AND CONTROL UNIT FOR TRANSMITTING DATA ON A CURRENT VEHICLE ENVIRONMENT TO A HEADLIGHT CONTROL UNIT OF A VEHICLE

FIELD

The present invention relates to a method for transmitting data on a current vehicle environment to an headlight control unit of a vehicle, to a corresponding control unit as well as to a corresponding computer program product.

BACKGROUND INFORMATION

Modern driver assistance systems include a controller for the headlight system, so that a driver of a vehicle recognizes as early as possible a route on which he should drive. The dazzling of other traffic participants should be avoided, in this context.

German Patent Application No. DE 10 2007 041 781 B4 describes a vehicle detection device for detecting vehicles, the vehicles traveling on a roadway while having a switched-on light.

SUMMARY

Against this background, the present invention provides an example method for transmitting data concerning a current vehicle environment to a headlight control unit of a vehicle, furthermore an example control unit that uses this method, and finally a corresponding computer program and a computer program product. Advantageous refinements are described below.

The present invention provides an example method for transmitting data concerning a current vehicle environment to a headlight control unit of a vehicle, the data having been taken using a camera and/or additional (environmental) sensor systems if necessary, for checking plausibility, and the method including the following:
  reading in object data concerning at least two objects, the object data representing information on objects which have been classified in an image taken by the camera as an object;
  forming object group data from the read-in object data of the at least two objects, the forming taking place using at least two different parameters, which were provided from image data of the image taken by the camera;
  transmitting the object group data as data concerning a current vehicle environment to the headlight control unit.

The present invention further provides an example device that is developed to carryout or implement the method according to the present invention in corresponding pieces of equipment. Such a device may be a control unit or, particularly, a data preparation unit. This embodiment variant of the present invention in the form of a device may also be used quickly and efficiently to achieve the object on which the present invention is based.

In particular, the present invention provides a data preparation unit for transmitting data concerning a current vehicle environment to a headlight control unit of a vehicle, the data having been taken using a camera; and the data preparation unit including the following features:
  an interface for reading in object data concerning at least two objects, the object data representing information on objects which have been classified in an image taken by the camera as an object;
  a unit for forming object group data from the read-in object data of the at least two objects, the forming taking place using at least two different parameters, which were provided from image data of the image taken by the camera; and
  an interface for transmitting the object group data as data concerning a current vehicle environment to the headlight control unit.

By a device or a data preparation unit one may presently understand an electrical device which processes sensor signals and outputs control signals as a function thereof. The device may have one or more interface(s) which are able to be developed as hardware and/or software. In a hardware type of development, the interfaces may, for instance, be part of a so-called System ASIC, which includes the most varied functions of the device. However, it is also possible for the interfaces to include discrete, integrated switching circuits or to be at least partially made up of discrete components. In a software design, the interfaces may be software modules which are present on a microcontroller in addition to other software modules, for example.

A computer program product is also of advantage, having program code that may be stored on a machine-readable carrier such as a semiconductor memory, a hard-disk memory or an optical memory, which is used to implement the method according to one of the specific embodiments described above, when the program is executed on a control unit, a data preparation unit or a unit corresponding to a computer.

By a vehicle environment one may understand, in this case, a current environmental scenario about the vehicle when the vehicle is traveling, or stated more generally, is participating in the road traffic. The vehicle environment may be formed, for example, by highway routing, delineators arranged at the roadway edge, traffic signs, oncoming vehicles or the like. Such a vehicle environment may be recorded using a camera as optical or visual sensor, a camera image being taken and evaluated. This camera image may subsequently be processed using a classification algorithm, so that individual objects in this camera image are recognized. The individual objects may, for example, be headlights of a vehicle or reflecting surfaces of delineators or traffic signs. Corresponding object data are produced for these objects, which represent the position of a recognized object in the camera image, the size of the recognized object, the shape of the recognized object or the like. Furthermore, by the evaluation of the camera image, a plurality of parameters on these recognized objects may be extracted, such as the brightness of the areas corresponding to the objects in the camera image, the optical sharpness of the areas corresponding to the objects in the camera image, or the like. Consequently, the object data may be data with reference to the geometric arrangement or position of the object in the camera image, whereas the parameters which are provided from the image data of the image taken by the camera refer to data that are determined by the measurement (i.e., the taking of the camera image, such as the color or the angle of view of a corresponding area of the camera image), over a history over time, (for instance, the speed of the individually recognized objects or even the age, i.e., how long or since when the object has been visible) or which have a relationship of the objects to other objects. By object group data one may understand a data packet which has information on a plurality of objects, the data packet for object group data having a smaller size than the sum of the object data of the individual objects which were taken into account in the formation of the object group data. The object group data may include, in this instance, data on objects of this object group which have parameters that are the same or are similar within a tolerance range. One may also, for example, use parameters to form such an object group which relate to an arrangement of objects with respect to one another.

In accordance with the present invention, because of the combination of data on several objects to a data packet in the form of the object group data, substantially more efficient transmission of data relating to the vehicle environment to the headlight control unit is possible, which is frequently supplied by a headlight manufacturer. In this case, it is not necessary to transmit the formations of each individual recognized object in the camera image, which would otherwise be problematic in the case of many recognized objects and in the case of limited available bandwidth for the transmission. Consequently, by forming the object group data, one is able to carry out a preprocessing of the visually taken vehicle environment, so that only data on, for instance, coherent areas of objects in the vehicle environment have to be transmitted to the headlight control unit, which are then able to be used for the control of the headlights. It may be recognized, for example, that two bright objects, that are circular, for instance, and situated at a certain distance with respect to each other, probably represent a pair of headlights of an oncoming vehicle or headlights of vehicles traveling closely behind each other, so that the headlight control unit is able to initiate measures for preventing the dazzling of the driver of this oncoming vehicle. In this context, light objects, which do not necessarily belong to the same vehicle, may also be grouped (for instance, as all oncoming vehicles). On the other hand, if the two objects recognized as circular were separately transmitted, this would cause a clearly higher effort in the transmission of the data on these objects, and would unnecessarily load the available onboard infrastructure. Consequently, the present invention offers the advantage of the unloading of the available data transmission structure in a vehicle, a desired functionality for maintaining a certain driver comfort being still able to be ensured. By using at least two different parameters to form the object group data using the at least two objects, one is able to implement a particularly reliable grouping of these objects into one object group.

In the step of the forming, it is favorable if parameters are used which represent information with regard to brightness, color and/or sharpness of an image area assigned to the object of the image taken by the camera and/or information with regard to a position, a distance and/or a motion of one of the objects with regard to the camera or with regard to the second of the at least two objects and/or the duration of the presence of the object in images of the camera back over time and/or an age of the objects. The objects are frequently followed by "tracking" (i.e., following) over several images. Tracking may be used, for instance, by ascertaining the speed of a vehicle from differentiation of the position: Using the object speed, one is able to predict the position of the object at the next measurement, and then ascertain the new position of the object with the aid of an estimation and the new measured values. When an object is uniquely identified (which is important for tracking), one is also able to calculate without great effort the "age" (for instance, by storing the time stamp of when the objects has first appeared). Such a specific embodiment of the present invention offers the advantage of parameters that are easy to ascertain, a reliable and simple grouping of the objects into object groups being possible nevertheless.

According to one further specific embodiment of the present invention, in the step of reading in, further additional objects relating to at least a third object may be read in, the additional object data representing data on the third object, which was classified as an object in the image taken by the camera, and in the step of forming, the object group data further being formed while using the additional object data. Such a specific embodiment of the present invention offers the advantage that even data with regard to more than two objects may be tied into the object group data. This means that the object group data may, for instance, include data on three objects, whereby an additional reduction in the data transmission load to the headlight control unit may be implemented. The larger the number of objects on which data are taken into account in the object groups, the lower is the utilization of a data transmission connection for transmitting data on the objects recognized from the camera image to the headlight control unit.

Two or more object groups are also able to be combined to a single one. In this context, of the series of objects, for instance, "small" object groups are formed, made up of a few objects, which are subsequently ever more merged, so as to form a larger object group from them. Using this technique, not only are a plurality of objects able to be combined to one object group, but also a plurality of object groups merged to form one.

In order to make possible an even more precise formation of object groups, more than two different parameters may also be used. Consequently, according to one further specific embodiment of the present invention, in the step of forming, the object group data are formed based on at least one third parameter that is different from the two parameters.

According to another specific embodiment of the present invention, in the forming step, object group data may be formed which include information on a position, a form, information on motion, an age (i.e., a dependence on time), a brightness, a color information, a number of the objects and/or a size of an image section, in which the at least two objects were detected in the camera image. Such a specific embodiment of the present invention offers the advantage that the headlight control unit is able to use the object group data very simply for the control, particularly for aligning the headlight, without having to set up more effortful calculations oneself.

It is also favorable if, according to one further specific embodiment, in the step of reading in, in addition two additional object data concerning at least two additional objects are read in, the second object data representing data on the two further objects which were classified in the image taken by the camera as an object, in the step of the forming, furthermore second object group data being formed from the read-in second object data of the at least two additional objects, the forming of the second object group data taking place while using at least two different parameters, which were provided from image data of the image taken by the camera, and in the step of transmitting, the second object group data are transmitted to the headlight control unit. Such a specific embodiment of the present invention offers the advantage of the transmission of a plurality of object groups or of a plurality of data associated with different object groups, so that in particular in the case of many recognized objects, the loading of a connecting bus to the headlight control unit may be further reduced.

In the forming of object groups it may be of advantage to take into account the form of the object group. Thus, for example, a combination could prefer a certain aspect ratio and accordingly could assign an object of the one or the other group. One could, for instance, also optimize on the average brightness of the object group or the object density in the area of the object group. In the parameter list described in greater detail below, in which the various parameters for forming the object groups are listed randomly, there are a plurality which relate to the form average brightness, etc., of the object group.

In order to make possible a particularly flexible forming of object groups, an object may also be ordered into a plurality of object groups. In such a specific embodiment of the present invention, especially in the step of reading in, further at least object data of an additional object may be read in, the object data of the additional object representing data on the additional object, which was classified as an object in the image taken by the camera, and in the step of forming, the object group data and the second object group data being formed while using, in common, the object data of the additional object.

It is particularly advantageous if not only abstract data are transmitted via an object group, but, as object group data, data are transmitted which relate to series of predefined scenarios about the vehicle, particularly in front of the vehicle. Such a scenario could, for instance, be that one (or more) vehicle(s) are oncoming with respect to one's own vehicle. In this case, as object group data, data could be transmitted on this current scenario of an oncoming vehicle. These data relate, for instance, to information on how far along the way the vehicle is located. According to such a specific embodiment of the present invention, thus in the step of forming, object group data may be formed which correspond to a predefined scenario in front of the vehicle known to the headlight control unit.

It is particularly advantageous if the design approach proposed here is used, in order to unload a data transmission bus, that is standardized, for example, for transmitting control signals of different vehicle components. In this case, still further control signals are sent as data to the headlight control unit via such a data transmission line. According to one further specific embodiment of the present invention, in the step of transmitting, the object group data may consequently be sent to a headlight control unit, which is situated in its own housing, independently of a data preparation unit and spatially separated from it, the data preparation unit carrying out the steps of reading in and forming, in particular, in the step of transmitting, the object group data being transmitted via a vehicle communications bus (such as a CAN bus, Flexray, optical bus systems, wireless systems) of the vehicle. Such a specific embodiment of the present invention offers the advantage that an already available data transmission system, in a vehicle, is able to be used without causing excessive loading of this vehicle data transmission system by due to the transmission of data to the headlight controller.

According to a further specific embodiment of the present invention, the step of forming may be designed in addition as responsive to a request signal of the headlight control unit, the request signal particularly having information on the selection of the parameters for the formation of the object group data and/or on a situation specification. The reading in of the objects is usually done cyclically, as soon as there are measured data of the camera. The request signal then makes possible in the group formation a stipulation such as, under the use of which parameters the objects are supposed to be combined. Such a specific embodiment of the present invention has the advantage that the headlight control unit is able to perform a preselection of parameters which are required for optimal light emission by the headlights of the vehicle. In this way it may be assured that the object group data include data on objects which all have certain parameter properties of the desired parameters.

Moreover, it is particularly advantageous if in the step of forming, further additional object group data are formed from the read-in object data of the at least two objects, the forming of the additional object group data taking place while using at least two additional parameters that differ from the parameters, which were provided by image data of the image taken by the camera, and in the step of transmitting, the additional object group data are transmitted to the headlight control unit. Such a specific embodiment of the present invention has the advantage that a part of the processing of the camera image may already be performed in the data preparation unit, and the prepared data may then be transmitted via the data transmission line. A preclassification of the objects with the aid of different parameter properties is able to take place in particular by grouping the individual objects into different object groups. In this way, a data processing load may take place going from the headlight control unit to the data preparation unit, so that, because of the transmission of the already prepared data, the data transmission capacity of the data transmission line of the vehicle is able to be utilized efficiently.

Below, the present invention is explained in greater detail with reference to the figures by way of example.

DETAILED DESCRIPTION OF EXAMPLE EMBODIMENTS

Figure 1:
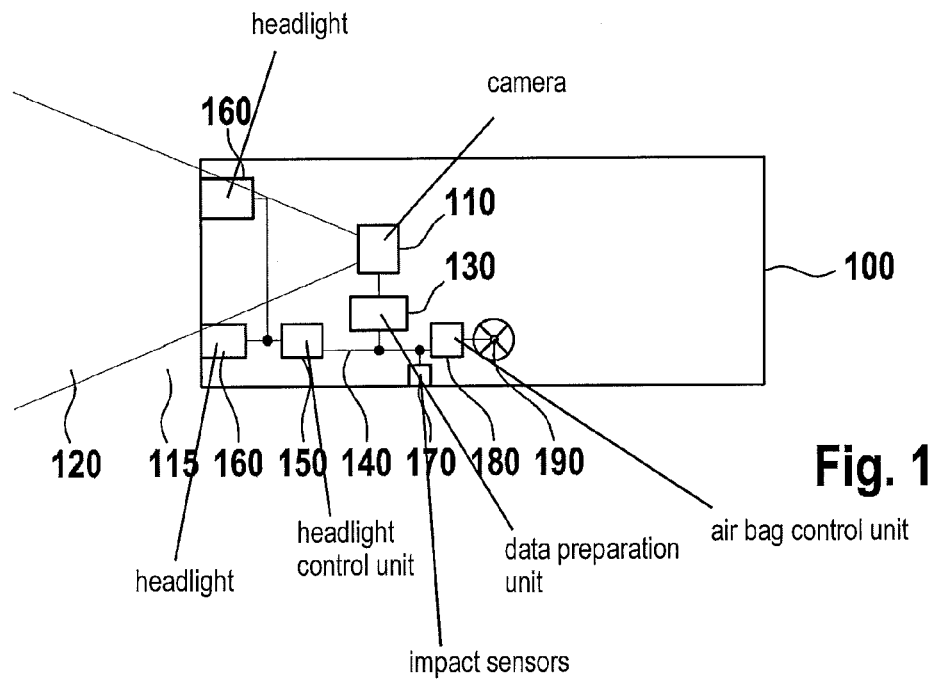
FIG. 1 shows a block diagram of a vehicle in which an exemplary embodiment of the present invention is implemented.

In the subsequent description of preferred exemplary embodiments of the present invention, the same or similar reference numerals are used for the elements that are shown in the various figures and act similarly, a repeated description of these elements having been dispensed with.

FIG. 1 shows a block diagram of a vehicle 100, which uses an exemplary embodiment of the approach described below to transmitting data to an headlight control unit. In this instance, the vehicle environment 115 is scanned by a camera 110 at an angle of view 120, and from this a camera image is generated of the vehicle environment 115. Camera 110 is used as an optical sensor, in this instance, and may be designed, for example, as a very reasonably priced CCD or CMOS camera, such as has meanwhile become broadly available. The camera image supplied by camera 110 will be processed further subsequently in a data preparation unit 130. Data preparation unit 130 may also be apart of camera 110, or be executed as software on a processing unit of camera 110 not shown in FIG. 1. In this context, an algorithm is used on the camera image, in order to recognize objects in the camera image and correspondingly to record parameters of the camera image which have a relationship to these objects. By such a parameter, one may understand, for example, brightness or color of a section of the camera image in which an object has been recognized.

In this data preparation unit 130 one may now carry out a grouping of several, i.e., at least two objects, this grouping taking place while using at least two different parameters, that are assigned to the two objects. The grouping takes place in such a way that, for example, a first parameter of a first object is compared to a first parameter of the second object, and a second parameter of the first object, which is different from the first parameter, is put in relation to a second parameter of the second object, the second parameter of the second object being also different from the first parameter of the second object. The first parameter represents, in this instance, equal variables in the first and second object, the second parameter also referring to same variables in the first and second object. Consequently, in this way, the grouping takes place with the aid of two different parameters which are put in relation to each other for each of the two grouped objects. For example, as the first parameter, a brightness of the first object may be compared to a brightness as first parameter of the second object and a speed and/or direction as the second parameter of the first object to the speed and/or direction as second parameter of the second object, the first object then being grouped with the second object into an object group, if both the brightness of the first object agrees with the brightness of the second object within a tolerance range and the speed and/or direction of the first object agrees with the speed and/or direction of the second object within a tolerance range. Consequently, the first object is grouped with the second one into an in-common object group, if both the first parameter of the first object agrees within a tolerance range with the first parameter of the second object, and the second parameter of the first object agrees within a tolerance range with the second parameter of the second object. The objects grouped in this way are thus combined in an object group which is able to be described by a lower information quantity than the two individual objects. This object group may be represented by a data set (which is designated as object group data below), which represents, for instance, information on the number of objects in the object group, a form of the object in the object group, a direction of motion of the object of the object group, a description and/or a statement on the position and/or a size and/or the form of the section of the camera image which represents the object group, or the like. Furthermore, the "age" of the object/object group in the image may be taken into account.

The data on such an object group are subsequently transmitted to headlight control unit 150, for instance, via a data transmission bus 140 such as a CAN bus, a FlexRay, an optical bus (e.g., MOST), wireless transmission (e.g., Bluetooth, ZigBee), and headlight control unit 150, using these object group data, controls the light distribution of a light cone or an illumination field of headlights 160 of vehicle 100. In this context, data transmission bus 140 may be a data bus already inserted in vehicle 100 as standard equipment, which, for example, also supplies signal transmission from impact sensors 170 to an air bag control unit 180 and/or a triggering signal from air bag control unit 180 to an air bag 190. By the grouping of a plurality of objects to form a common object group and the transmission of such object group data via data transmission bus 140, one is consequently able to implement a reduction in the data on the objects recognized from the camera image transmitted via data transmission bus 140. By such a reduction of the data transmission load, a possible overloading of data transmission bus 140 is able to be avoided, although an optimal illumination of vehicle environment 115, by the precise supply of the headlight control unit with requisite data still becomes possible, in order to implement an optimal actuation of headlights 160 using headlight control unit 150.

Furthermore, freed resources in the camera may be used to precalculate situations. Thereby the calculating performance of the camera and the headlight control unit do not have to be designed for a peak load.

A detection algorithm FDD (=vehicle detection in darkness) which is in camera 110 itself or, as is stated with respect to data preparation unit 130 in FIG. 1, recognizes and classifies bright objects and distinguishes e.g. vehicles, reflectors and street lights, for instance, at night. Objects which cannot be assigned to any of the categories are sorted in or classified as "unknown objects". In the vehicles, front lights and rear lights are distinguished. The distinction between front lights and rear lights is carried out, for example, by the parameter "light color" of the detected objects. The individual light sources, as recognized objects, are combined to form light pairs as an object group, if possible. Furthermore, an object detection/object classification of a blinker signal and other signal devices of vehicles, illuminated infrastructure (such as traffic lights), bicycles and pedestrians (wearing reflectors) may be useful.

The detected objects have an image position (angle of detection) both in the vertical and the horizontal direction. When a headlight pair has been detected, their distance may be very crudely estimated (to an accuracy of a plurality of meters) from the distance of the two headlights from each other. The reason is the fluctuation of the installation positions or the distances apart of the headlights.

The objects may be used for simple high beam assistants which switch back and forth between high beam and low beam. For a simple implementation (without situation detection) the recognition of the presence of other traffic participants is sufficient in this case (cf. J. Rebut, "A Monocular Vision Based Advanced Lighting Automation System for Driving Assistance", IEEE International Symposium on Industrial Electronics, 2009).

Figure 2:
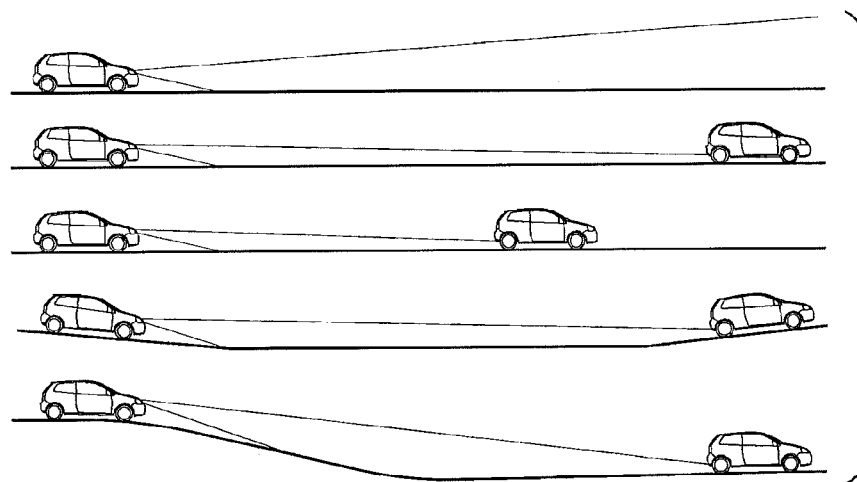
FIG. 2 shows a schematic representation of the adaptive bright-dark border from the journal Automobil-Elektronik.
Figure 3:
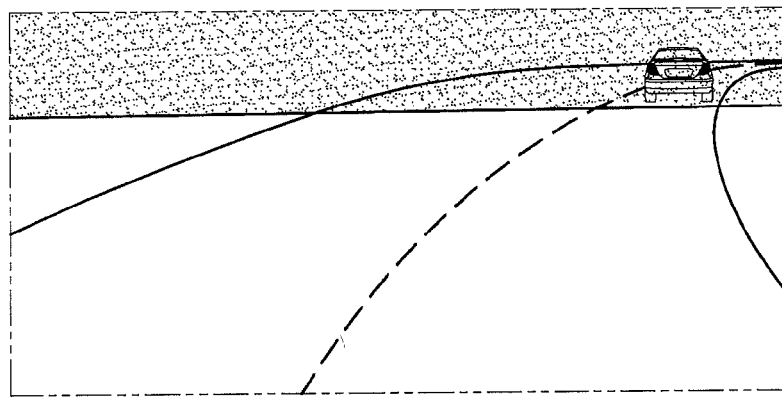
FIG. 3 shows a representation of a schematic adaptation of the illumination range of headlights to preceding vehicles (with reference to a vertical angle) from the driver/camera/headlight perspective.

In broadened high beam assistants, such as the "AHC" function (AHC=Adaptive High Beam Control), the radiation angle of the headlight is raised to the extent that the vision distance of the driver is increased, but the other traffic participants are not dazzled. This is shown in the partial figures of FIG. 2, as schematic representations of AHC in different scenarios of a vehicle illumination on an uneven roadway and/or having a preceding vehicle. In order to be able to calculate the radiation angle of the headlight, the vertical position and, if possible, the distance from the object should be known. This is reproduced in FIG. 3, in this figure a schematic adjustment of headlights to preceding vehicles (vertical angle) being shown as driver perspective/camera perspective/and headlight perspective. The high beam assistant is related to dynamic illumination range regulation, in which the illumination range is adjusted. In this last-mentioned case, there takes place, however, an adjustment to a constant operating range.

Figure 4:
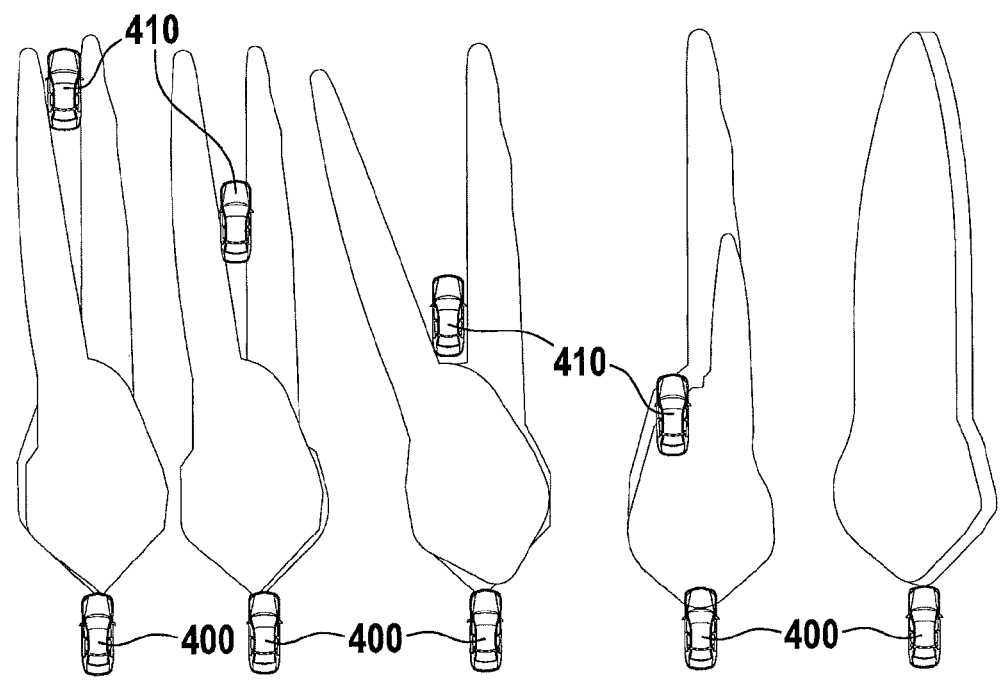
FIG. 4 shows a schematic representation of the dazzle-free headlight after a representation of D. Grimm, "trends in automotive lighting, new technology and its benefits for end-users", 8th International Symposium on Automotive Lighting, 2009.
Figure 5A:
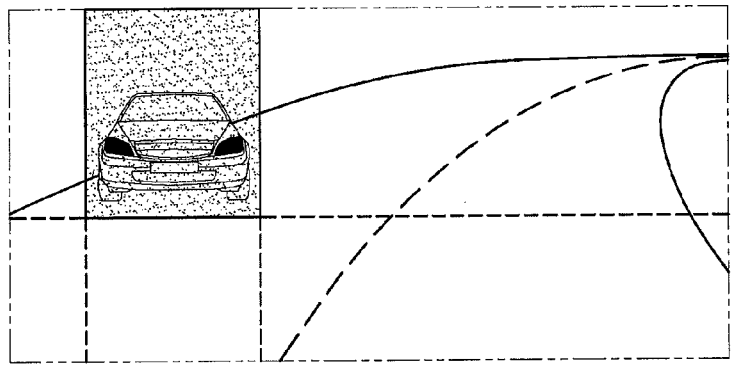
FIG. 5A shows a schematic representation of the dazzle-free headlight in a single vehicle (with reference to a vertical and horizontal angle), from the driver/camera/headlight perspective.

For the light assistant "dazzle-free high beam" (also called CHC=Continuous High Beam Control) the right and left headlight may be pivoted apart from each other, in order to generate a shadow area about the vehicles. FIG. 4 shows a schematic representation of the dazzle-free high beam, corresponding to the representation from D, Grimm, "Trends in Automotive Lighting, New Technology and its Benefits for End-Users", 8th International Symposium on Automotive Lighting, 2009, as to how such a pivoting apart of the light cones takes place in different travel positions, when one's own vehicle 400 is traveling towards an oncoming vehicle 410. For the calculation of the shadow range, in addition to the vertical object position, the horizontal coordinates of the traffic participants should also be known, as is shown in the schematic representation of the dazzle-free high beam for a single vehicle (vertical angle and horizontal angle) from the driver perspective/camera perspective/headlight perspective corresponding to FIG. 5A. The traffic participants are then "undazzled" in common.

In pixel light and matrix beam, the space ahead of the vehicle is divided into segments, which are able to be illuminated individually. The functionality is similar to the dazzle-free high beam, the actuation having a greater flexibility. No in-common shadow range has to be produced.

In addition to the object angles, if more data are available, situations may be calculated from this to which there is a reaction (e.g., adjustment of parameters). A situation detection is required to develop modern assistance systems.

Depending on the system development, the recommendation of the setting of the headlights may come from the camera (or the integrated camera control unit) or it may be determined in the headlight control unit. The calculation within the camera is advantageous, since in this location, all measured values are able to be accessed (altogether all the objects measured by FDD and all additional data, but also lane data, for example).

However, the calculation frequently takes place in headlight control unit 150 corresponding to FIG. 1, if the headlight manufacturer implements the entire actuation of the headlight. For the actuation, the objects measured by FDD should then be transmitted from the camera to the headlight control unit in an object list. For this purpose, before the development, a number of objects to be transmitted is established (e.g., 8 pieces in the project of a certain vehicle manufacturer), which are cyclically transmitted via the CAN bus. If the camera detects a greater number of objects, it either has to omit objects or it has to combine the objects.

The omitting of objects and the combining of objects to form groups have effects upon the actuation possibilities of the headlight control unit. If the group is not selected in a meaningful manner, or the wrong objects are not sent, the headlight control unit is not able to make the best decision on setting the headlight. It is also possible that the headlight control unit does not interpret the situation properly because of the missing data.

The manner of combination of the corresponding objects has an effect on the efficiency of the entire headlight actuation. A good combination of objects ensures an optimal availability of the function.

Figure 5B:
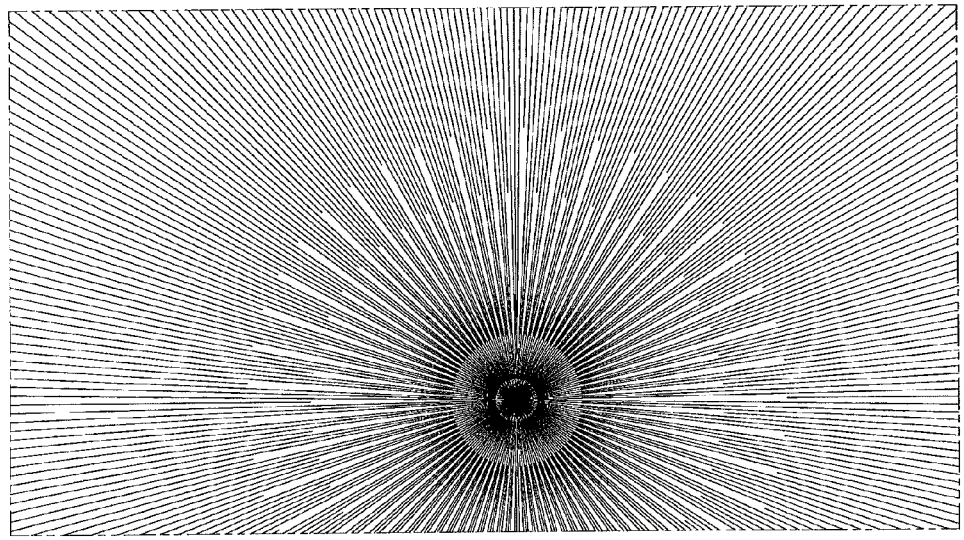
FIG. 5B shows a representation of an optical flow while using "optical flow" vectors.

One particular aspect of the present invention relates to the use of FOE, that is, "Field of Expansion". In the detection of an optical flow, it is taken into consideration how the objects are moving. In this case, the position of the FOE is used, in order, for example, to combine vehicles that are close to the FOE, since these are probably far away. In FIG. 5B, (corresponding to the explanation from http://de.wikipedia.org/wiki/Optischer_Fluss) vectors with regard to an "optical flow" are reproduced. In this case, long lines are created by large movements of fixed points on certain objects. The flow lines intersect here in the "Field of Expansion" (FOE) rather in the center of the image (or they seem to originate there). From this FOE point/FOE region all things seem to be created and to become larger during approach (which leads to an optical impression of an expansion).

The FOE is not always centrical. It is displaced, for instance, during cornering in the direction of the curve. New objects then normally do not appear any more in the middle of the image.

In the following approach, that is described in even greater detail, it is explained which combination of data may be used in order to undertake a meaningful grouping of objects. Such a grouping may also be designated as clustering. The grouping is required particularly in order to be able to provide the headlight control unit with all the necessary data, even if there are too many objects for the bandwidth available.

Furthermore, it is described that one may transmit situations to the headlight control unit, and that in that manner the headlight control unit is unloaded of calculations and is best able to use the data present in the camera.

For the transmission of object groups (object clusters), rectangles are mostly used, but other geometric forms may also be transmitted, in order to achieve optimized data representation at constant bandwidth.

In order to produce such an object group or object cluster, at least two parameters of objects should be put in relation to one another in order to be able to undertake a grouping of the corresponding objects precisely in one object group. These parameters should relate to the same properties of the two objects. If the two parameters of two objects agree within a tolerance range, the two objects should be grouped in one object group. Naturally, more than two objects may also be grouped in one object group, in which case then both the first and the second parameter for all the objects grouped in the object group should lie within a tolerance range.

For the grouping of the objects, many different attributes or properties or parameters of the detected objects or parameters of the camera image may be drawn upon for the calculation of an object group.

For the combination of objects to form object groups, a combination of attributes of various objects with one another is calculated to form a group (cluster). The following parameters may be named as examples for the parameters considered for the object grouping:

a detection angle relative to the optical axis of the camera
 (corresponds approximately to the pixel position)
 horizontal object position (coordinates)
 vertical object position (coordinates)
distance of the object from the camera
type of the object (vehicle, street light, reflector, . . . ),
travel direction or vehicle illumination type (headlight, rear light, . . .
 oncoming (headlight)
 preceding (rear lights)
extension of the object (height, width)
form of the object (angularity, roundness)
aspect ratio of the rectangle which encloses the object/object group (this aspect is predominantly useful during "letting grow" object groups, that is, one group already exists and it is being considered which object is still to be added).
brightness of the light source (average) brightness of the rectangle which encloses the object or object group (if necessary, also rectangle/geometric form which encloses the group)

color of the light source the distance (angle of detection) from the next/neighboring object distance apart of the midpoints of the objects the distance between the individual objects duration of the detection of the object ("age" of the detected objects, i.e., duration as to how long before the current recording the object had already been detected)

the relative speed to one's own vehicle (scaling changes, distance changes, position changes)

(estimated) height of the object above ground (→ e.g., combination in the case of street lights)

proximity to FOE (Field of Expansion)

direction of motion/extent of motion in the camera image position with respect to each on the road (e.g., "combine all vehicles after the second vehicle")

logically matching objects (e.g., recording a column, putting together blinkers with rear lights, . . . )

taking into account the course of the road during grouping (the course of the road is not an object property in the closest sense, but is able to influence group formation. The course of the road does not necessarily have to be detected by the camera, but may also be read out by a navigation unit).

the size of a halo about the light object (halos being proportional to the distance of the light object and the atmospheric conditions such as fog)

the edge steepness of the edges of the light sources (the edge steepness being inversely proportional to the halo and the radiation characteristics of the light source)

glowing surface area (e.g., size of the glowing surface area)

differences in brightness within the object (in order to combine signs, for example)

orientation of the object number of objects in the object group object density in the object group (number of objects per area of the group)

self-motion of the vehicle or the taking camera (in order, for example, to adjust to rapid changes in the image at high speed/yawing rate)

type of light source (e.g., LED, high intensity gas discharge lamp, . . . )

relative/absolute brightness changes in the light source (in order to ascertain an approaching speed)

frequency of the change in brightness (in order to detect, for example, clocked light sources such as LED's).

results of the surface estimate of the camera and/or a navigation system (e.g., steepness of the road ahead of the vehicle)

distance from measured data of other foresighted sensors (e.g. distance from objects which have been ascertained with the aid of radar reflexes and/or ratio of pixels of at least two different spectral filterings (also: spectral filtering=no filtering) ~light color.

The abovementioned parameters are named only in exemplary fashion, at least two parameters being used for as precise as possible a grouping of the respective objects into a common object group.

In the following, individual parameters, of the ones named above, are explained in greater detail.

Parameter Object Distance

Normally, the light distribution is set to the object/objects standing closest to the vehicle. In addition to the actual estimate of the distance of the object, additional data may used to estimate the distance.

Among these is also, for example, the position of the detected object in the (camera) image, using which one is able to estimate the distance when the surface and the height of the light source are known. One may also estimate a distance from the size of the object, since objects that are far away in the image appear smaller than near objects (FDD uses, among other things, the width of the headlight pair to estimate distance).

In the case of atmospheric influences, such as dampness in the air, a blaze of light forms, a so-called "halo", about the light objects, since the light is scattered by the water droplets. The farther away the vehicle, the more water droplets there are between object and camera, and the bigger becomes the halo. When a halo is present, the edge steepness of the light source also drops off, that is, the objects are only still detected not sharply by the camera or at a lower sharpness, than without moisture in the air. Light sources in the case of vehicles mostly have a maximum permitted size, which becomes smaller with distance in the camera image. In the case of vehicles traveling one behind the other, the knowledge of the exact properties of the rear vehicles for the headlight actuation is mostly second rank—the relative position of the vehicles on the road, with respect to one another, may therefore also be used as the distance (even in the case of covering effects, in which no distance is able to be calculated because of only single headlights).

The brightness may be used for a distance estimate, because it is reduced as the square of the distance (above all when the light source is imaged on less than one pixel, and is thus averaged with dark shadow areas. Because of the average-forming character in the imaging on pixels, differences in brightness within the light source are also lost, for, the farther away the light source, the lower the differences in brightness turn out within the object.

The self-motion ascertained of the camera may be used, for example, at high speed, in order to combine fewer or only the far-away objects, because one is approaching more rapidly. The "age" of an oncoming object may also be used (along with other parameters such as self-motion, surface estimate) to draw a conclusion on the distance.

Objects which are close together in the image, are probably also close to one another in reality and have similar distances.

Parameter Object Motion

The parameter "object motion." has an influence on the dynamics of the overall system and on the situation detection (such as oncoming vehicles).

The object motion may be estimated directly from the image, or rather by differentiation of the object position in the image. Furthermore, with the aid of the vehicle illumination type, one is able to conclude upon the qualitative speed/future position change. Rear lights, i.e., preceding vehicles mostly result in small changes in the relative position, since they normally travel in the same direction as the host vehicle. When oncoming vehicles come close (i.e., have a low object distance and/or are recorded at a large object angle to the normal of the camera image), they have great dynamics (especially during passing).

The travel direction and the vehicle illumination type may be detected with the aid of the color of the light. The color of the light may also be used for object grouping. Thus, for group formation, for instance, the same light colors (for the group formation for objects of the same travel direction) may be used, but also different light colors (such as assigning yellow blinker signal to the adjacent light sources). A measurement of the light color may take place by color reconstruction, in which from at least two different colored pixels (for instance, red and grey/colorless/only intensity; in the case of digital cameras mostly three colors: red, green, blue) the color value is estimated. Instead of using a finished calculated color, even the relationships/differences between the (color) pixels are able to be evaluated in the light source.

The brightness of a light source is a function of the square of the distance (a photometric distance law). When the object approaches the camera, the brightness increases, or rather the size/area of the object. For this reason, the change in brightness, for example, may also be used as a parameter for group formation.

The "age' of objects (i.e., the duration of the object in the image) has a different effect on the prospective dynamics of the object: an "old" object may be slow (with reference to the speed of the camera), (for instance, a preceding vehicle), but may also become fast (as, for instance, an oncoming vehicle at a good view during passing). Different object categories or object groups represent objects, for example, having different speeds which is able to be also taken into account, so that, for instance, no self-motion of street lamps, traffic lights, reflectors have to be taken into account. The orientation of the object may even have an effect on the further motion. Thus, for example, objects having the same orientation may be combined into one object group, or objects which after the estimation of the orientation are able to travel in the same direction may be combined into one object group.

Reduction in False Classification

FDD is not always able meaningfully to combine the individual objects into pairs. In the superordinated functional layer, supposed individual objects may be grouped again if they are similar and/or if they fit into the overall context. In the superordinated functional layer, one may also revert to the measuring data of other environmental sensors (even other camera-based measuring algorithms), in order to bring the measuring data into connection and to carry out improved grouping over what would be possible without the additional measured variables.

If there are too many detected objects in the image, which are not all able to be transmitted, these many objects should be combined to one or more object groups, in order to minimize the data transmission load via the data lines. In this context, the combination threshold of individual objects may be lowered in comparison to FDD, for example.

The individual objects may be combined in such a way that, for instance, objects having a similar shape are combined, or of similar light sources (frequency in the case of LED, light color bluish in the case of xenon, reddish in the case of halogen).

There may be situations in which strongly reflecting road signs are detected as objects/vehicles. In such a case, for instance, the shape, the aspect ratio of the enclosing rectangle (or the enclosing geometrical shape) its area and average brightness (and brightness change within the shape) may be evaluated, in order to merge, for example, with other objects supposedly not relevant to dazzling. Signs which, if they are large, may split up into a plurality of objects, such as an accumulation of signs in the traffic space, may thus be combined.

Group Formation

Depending on the strategy, it may be meaningful to combine as many objects as possible into one group or a plurality of groups having as few objects as possible (number of objects in a group).

Depending on headlight assistant/development, it may be meaningful to include the aspect ratio. Thus, for example, for a finer gradation in the dazzle-free headlight, a grouping standing on end of objects (i.e., a grouping of objects which are situated one on top of another in the camera image) could be preferred, but in the case of individual lights a grouping corresponding to a vehicle geometry (e.g., also headlights together with position lights).

Completion for Group Formation (Clustering)

To reduce the data, not only a single object cluster or a single object group has to be formed. It is also possible that a plurality of groups is formed (for instance, to reduce the number of objects in a group).

Furthermore, it is not excluded that an object might be present in a plurality of groups. That is a possibility if, for example, the object belongs both to the groups (clusters) "oncoming and close", and "rapid motion to the left".

The objects are combined into groups in a meaningful manner, whereby also the parameters of the group objects should be adjusted.

It is also possible to provide special messages for object groups.

Instead of a list having individual objects (mixed with groups, if necessary) one may also transmit group data exclusively. In the transmission of exclusively object group data (cluster data) it is advantageous that an identification may be done without in the communications message as to whether the data transmitted are group data or individual object data, whereby the information to be transmitted is able to be further condensed. In this context, a "bounding box" object group should be transmitted which includes all vehicles (from which one could extract horizontal and vertical coordinates for the range that is to be glare-free). Alternatively, other group data may be transmitted. It has to be ensured, however, that all the vehicles of these groups are included overall. In the special case in which no individual objects but exclusively group data are able to be transmitted, and only one individual object has been detected by the camera, an individual object may also be present in a "group". This may also be the case if groups having specific properties are being transmitted, but only a single object fits in this group (e.g., a group "all oncoming vehicles which are closer than a certain distance" and there is only one oncoming vehicle.

Instead of rectangles having ranges of the camera image as an object group or object cluster, object groups having other geometric shapes may also be transmitted as an image section of the camera image. Besides rectangles and trapezoids, generally "multi-angles" also belong to the definition of regions.

The regions may also be described as round shapes (e.g., circle, ellipse, cornering curves, Bezier curves, . . . ).

It is of advantage if the regions have a "crucial point" assigned to them (e.g., a center, "most important point"). The crucial point does not have to reflect the actual center of gravity of the geometric shape, but may also be the thematic center of gravity (such as the front vehicle in a column).

To the shape, or rather the crucial point, additional motion date (translation, rotation, scaling/size change) may be assigned, in order to give data on their probable development. Because of that, the algorithms based on that are able to work in an even more anticipatory manner.

In place of a group formation, objects that are taken as not particularly relevant may be omitted (e.g., the central vehicle of a grouping).

It is of advantage if the camera is able dynamically to adjust the parameters, according to which the groups are formed, to the respective situation, so as to achieve an optimal information density.

It is possible that the headlight control unit requires various parameter settings of the camera, or requires situations which it needs for an optimum headlight actuation. In that way, the camera is able to use the available calculating effort for the required situations and, by an intended adaptation of the parameter compilations, achieve an optimal information density of the data transmitted and an optimal information transmission. The compilation of the objects and situations does not have to be fixed, but may be changed. If the headlight control unit has more "intelligence", it may decide for the camera, which has then be kept simpler, how it is to carry out the compilation of the objects, so that the result is able to be adjusted to the own requirements of the travel situation.

Parameter Travel Situations

This parameter relates to the transmission of detected traffic situations, whose probability (optional) and appearance position in the image (optional). The position or the situation range may be stated as a geometric shape, in this context (e.g., rectangle, trapezoid, ellipse, . . . ), which describes an angular range relative to the vehicle (e.g., object angle, pixel coordinates, . . . ), but also in other coordinate systems. The position may also be given as a segment (e.g., in response to a previous segmentation of the image). In addition to the position, the (relative) direction of motion may be transmitted. This also applies for the regular object groups.

The separation and the calculation of the headlight actuation between camera and headlight control unit does not have to take place at the level of the objects. The measured or detected objects and other data, (such as lane data) may be combined to form various "situations" (i.e., travel scenarios). These situations may be sent to the headlight control unit, whereby its resource requirement drops off, and the data present in the camera are able to be used better. The measuring variables (parameters) are combined to form travel situations and are sent to the headlight control unit.

In addition to the type of travel situations (such as passing vehicle, oncoming column, S curve, . . . ) the range of the travel situation may also be stated. This may be done, for example, via the statement of a point (such as the "most important" point in this situation, e.g., the center of the first oncoming vehicle) and/or the statement of a region. Depending on the situation, it is meaningful to state a direction long with the rest so as to obtain a tendency in the movement of the situation. An (optional) probability for a corresponding travel situation leaves interpretational play to the headlight control unit and enables smoothly flowing transitions between individual travel situations.

The coordinates of the group may be the center, but it may also be about a representative point or the most important point of the group for the light functions. This is connected, above all, to the geometry of the group chosen, but also to the bandwidth available during transmission.

A few examples of the transmission of object group data to the headlight control unit are shown below. From the transmitted data, the headlight control unit should ascertain the optimum actuation for the individual headlights of the vehicle.

Figure 6A:
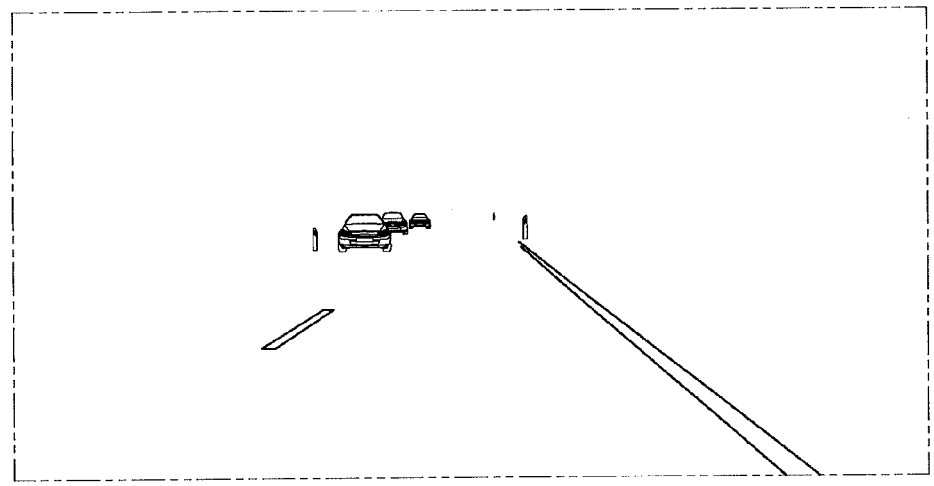
FIG. 6A shows a camera image, as is taken, for instance, by a camera in a vehicle.
Figure 6B:
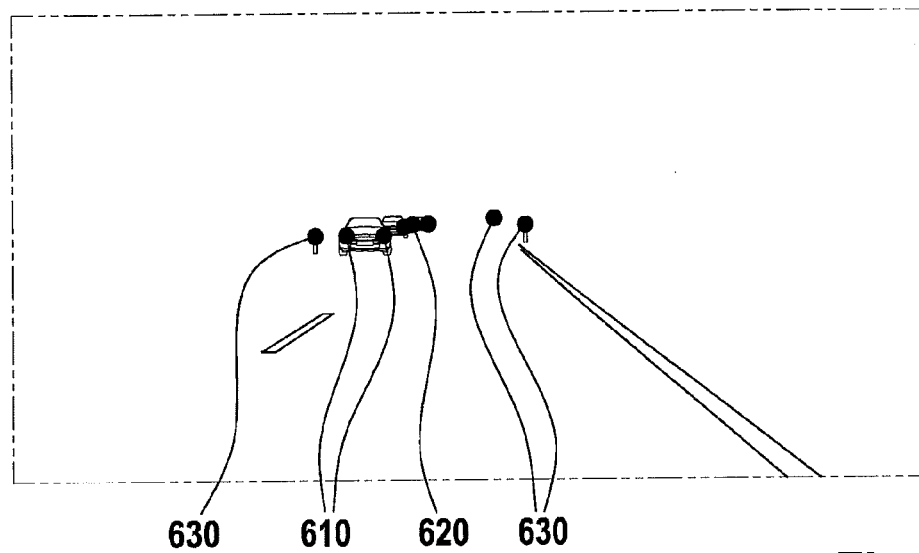
FIG. 6B shows a processed camera image, in which objects have been recognized by an object recognition algorithm.

First we shall look at an exemplary situation according to FIG. 6. In the camera image shown in FIG. 6A, three vehicle may be seen traveling one after the other. The object detection algorithm FDD recognizes an oncoming headlight pair 610 and three additional light sources 620, as well as three reflectors 630 in the vehicle's environment, as shown in FIG. 6B.

Figure 6C:
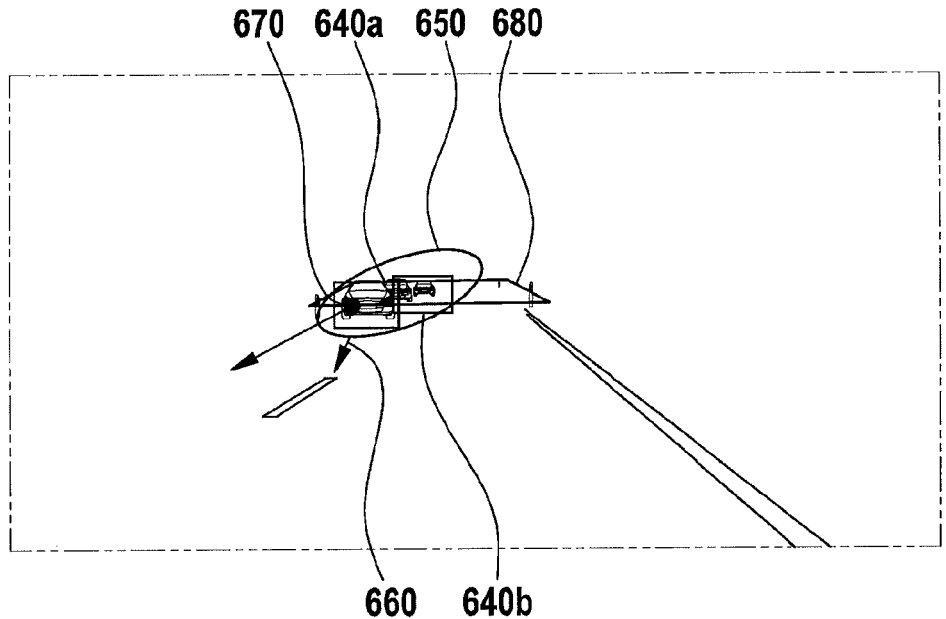
FIG. 6C shows an image from a camera in which several objects have been grouped in embodying an exemplary embodiment of the method according to the present invention.

In this example, two object groups 640 (which are classified as rectangular areas in the camera image) are formed, as is reproduced in the representation in FIG. 6C. The front vehicle (front headlight pair) is an object 640*a* (alone in the "group"), and the subsequent vehicles are combined in a common group 640*b*, for instance, on the basis of the same or very similar brightness values and speeds with reference to the camera. Furthermore, ellipse 650 describes the area of the camera image (i.e., an object) for the travel situation "column" having an estimated change in direction (speed arrow 660) as well as, for example, a similar brightness of the objects in the object group(s). Point 670 describes the situation "passing vehicle" (as data for the headlight control unit) or it describes the object in an object group or as an individual object that is the soonest to be endangered by being dazzled, and for which regulation must particularly be carried out using direction of motion. Trapezoid 680 describes the group of reflectors 630.

In the same way a region could be generated separately for preceding vehicles, for example, which are combined at the most distant object (which are independent of light color, for instance) and a region for road lights.

Because of the approach presently presented, it becomes possible to send bright objects, detected at night, efficiently to an headlight control unit, which implements a light actuation from this. If many objects appear in the image, then, on account of the present approach, a plurality of these objects may advantageously be combined to a group, so that bandwidth is saved and/or all relevant data are able to be transmitted. In the present approach, different combinations are introduced, so that the headlight control unit is able to derive meaningful actions from them.

Figure 7:
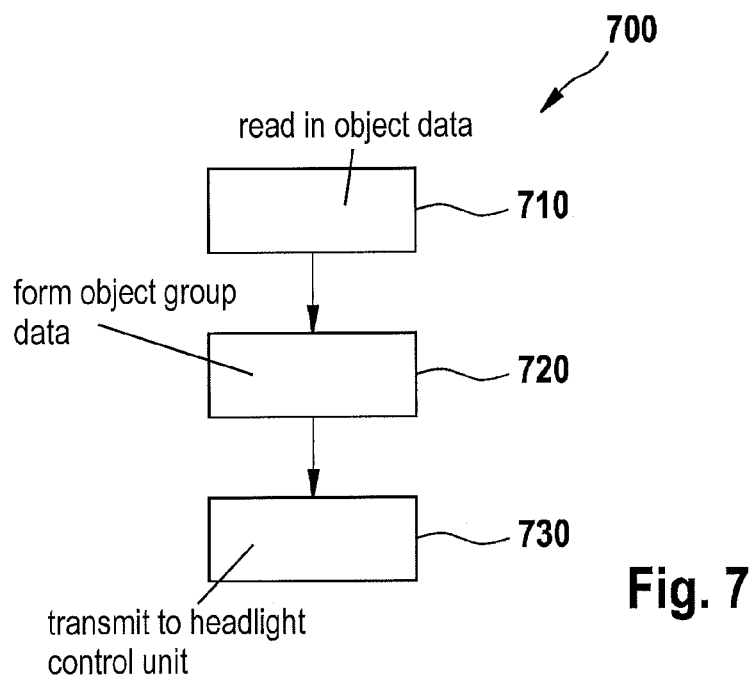
FIG. 7 shows a flow chart of an exemplary embodiment of the present invention.

Moreover, FIG. 7 shows a flow chart of an exemplary embodiment of the present invention as method 700 for transmitting data via a current vehicle's environment to an headlight control unit of a vehicle. The data were taken using a camera. The method has a step for reading in 710 object data concerning at least two objects, the object data representing data on objects which have been classified in an image taken by the camera as an object. Furthermore, the method includes a step for forming 720 object group data from the read-in object data of the at least two objects, the forming taking place using at least two different parameters, which were provided from image data of the image taken by the camera. Finally, method 700 includes a step of transmitting 730 the object group data as data via a current vehicle environment to the headlight control unit.

Figure 8:
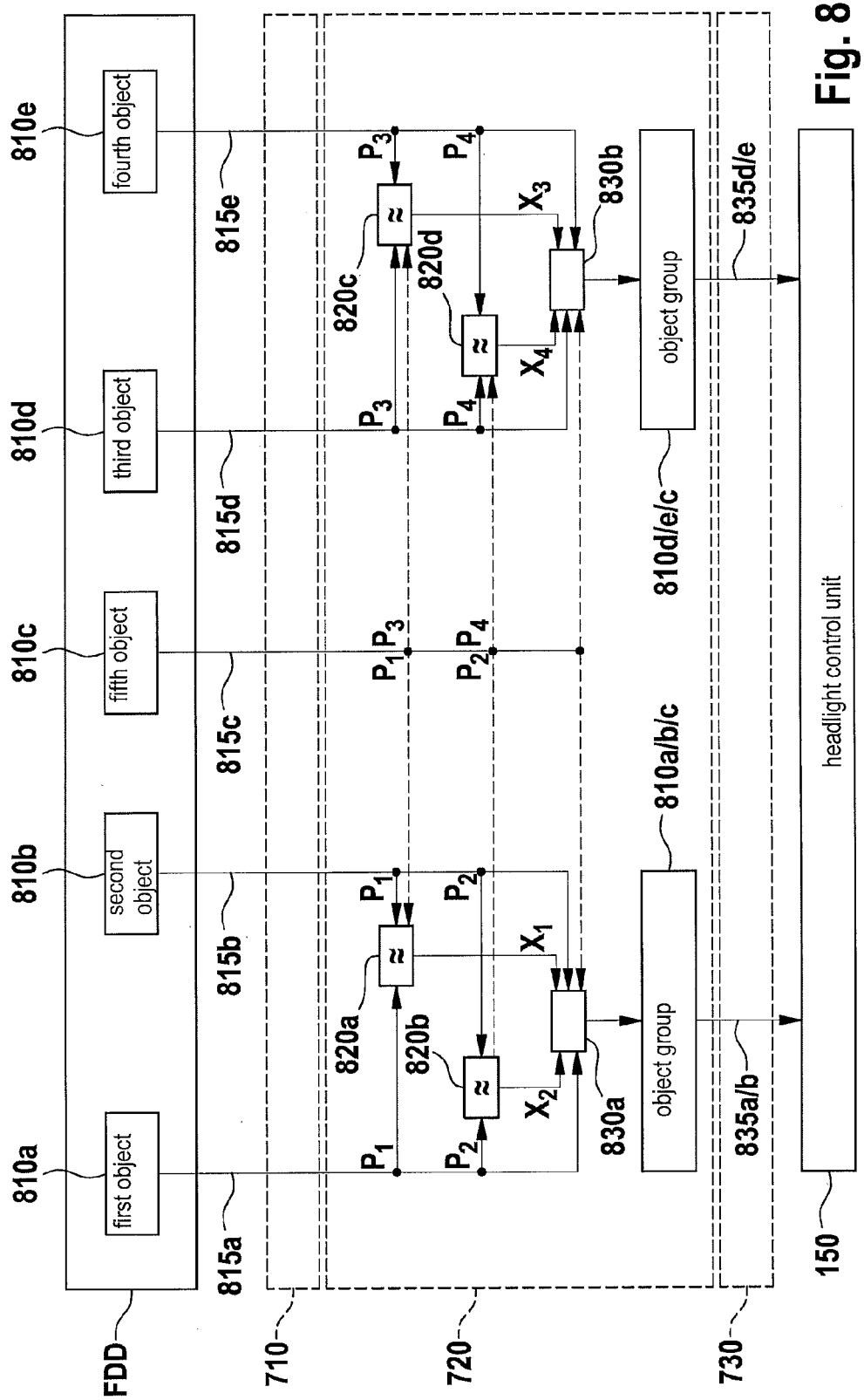
FIG. 8 shows a detailed flow chart of an exemplary embodiment of the present invention including the transmission of the generated object group data to an headlight control unit.

In FIG. 8 a flowchart of an exemplary embodiment of the present invention is shown as a method, the procedure being shown in greater detail in the formation of object group data or rather, the object groups. Next, objects 810*a* to 810*e* are generated from a camera image, for instance, using object detection algorithm FDD. These objects 810 may be described by certain data 815*a* through 815*e*, which represent, for instance, a position in and/or a size of an image section of the camera image. This means that these data 815*a* through 815*e*, which represent the respective objects 810, are transmitted and are used as representation of these "objects". At the same time, certain parameters, as have been listed above, are determined with reference to the objects and are also provided, for example, in a data frame, which contains the object data, for further processing. Objects 810*a* through 810*e* are subsequently read in a first step 710 of the method described in greater detail above. Object 810*a* and object 810*b*, for example, may be headlights detected of oncoming vehicles. These objects 810*a* and 810*b* may now be investigated with the aid of two different parameters P1 and P2. First parameter P1, for example, may be a brightness of object 810*a* and 810*b* detected in the camera image, and on the other hand, parameter P2 may represent a speed and/or a direction of these objects detected in the camera image. Now, if in a first comparator 820a it is ascertained that parameter P1 of first object 810a is within a tolerance range equal to that of the first parameter of a second object 810b, this may be signaled to a first combiner 830a by comparator signal X1. Analogously, it may be checked in a second comparator 820b whether second parameter P2 of first object 810a also corresponds within a tolerance range to the second parameter P2 of second object 810b, which is also signaled by a comparator signal X2 to first combiner 830a. If combiner 830a obtains the information via first and second comparator signals X1 and X2 that both first parameters P1 and second parameters P2 of the two objects 810a and 810b are the same within a tolerance range, first combiner 830a is able to form from first object 810a and second object 810b an object group 810a/b, and is able to output corresponding object group data 835a/b in a step of transmitting 730 via a data line 140 to headlight control unit 150. Furthermore, it is also possible to use even more parameters and comparators, the number of parameters and comparators being as large as needed.

Moreover, object 810d and object 810e, for example, may be rear lights detected of preceding vehicles. These objects 810d and 810e, which are represented by object data 815d and 815e, may now be investigated with the aid of two different parameters P3 and P4. Third parameter P3, for example, may be a color of object 810d and 810e detected in the camera image and on the other hand, parameter P4 may represent a distance of this from the objects detected in the camera image. Now, if in a third comparator 820c it is ascertained that third parameter P3 of third object 810d is within a tolerance range equal to that of the third parameter of a fourth object 810e, this may be signaled to a second combiner 830b by comparator signal X3. Analogously, it may be checked in a fourth comparator 820d whether fourth parameter P4 of third object 810d corresponds within a tolerance range to the fourth parameter P4 of fourth object 810e, which is also signaled by a comparator signal X4 to second combiner 830b. If second combiner 830b obtains the information via third and fourth comparator signals X3 and X4 that both third parameter P3 and fourth parameter P4 of the two objects 810d and 810e are the same within a tolerance range, second combiner 830b is able to form from third object 810d and fourth object 810e an object group 810d/e, and is able to output corresponding object group data 835d/e in a step of transmitting 730 via a data line 140 to headlight control unit 150.

Moreover, a fifth object 810c and corresponding fifth object data 815c may also be read in. In a step of forming 720, it may then be checked whether fifth object 810c should be grouped with first object group 810a/b and/or with second object group 810d/e. From object data 815c of fifth object 810, for example, a value of first parameter P1 and a value of second parameter P2 may be picked out, and it may be checked whether the value of first parameter P1 and a value of second parameter P2 of fifth object 810c within the respective tolerance ranges agrees with the value of first parameter P1 and second parameter P2 of first object 810a and second object 810b. If this is the case, first combiner 830a groups fifth object 810c into first object group 810a/b.

Alternatively or in addition, in the step of forming 720, it may also be checked, for example, whether fifth object 810c is to be grouped into second object group 810d/e. For instance, from object data 815c of fifth object 810, a value of third parameter P3 and fourth parameter P4 may be picked out, and it may be checked whether the value of third parameter P3 within the tolerance range agrees with the value of third of third parameter P3 of third object of 810d and fourth object 810e. If both the value of third parameter P3 and the value of fourth parameter P4 of fifth object 810c agree within the respective tolerance ranges with values of third parameter P3 and fourth parameter P4 of the third object and the fourth object, second combiner 830b groups fifth object 810c into second object group 810d/e.

If, for instance, fifth object 815c represents an upper sidelight of an oncoming passenger car, this may be detected with the aid of the brightness (of an active white light) and the speed and direction of motion, the brightness then possibly being able to deviate more greatly from the brightness pattern of first two objects 810a and 810b. At least a distinction may thereby be made of fifth object 810c from objects 810d and 810e of second object group 810d/e, since the color of the sidelight differs from the color of the rear lights. In this case, the object group data of the first object group 810a/b are enlarged to a broadened object group 810a/b/c, these data of the broadened object group 810a/b/c are assigned, for example, to a substantially larger section of the image recorded by the camera than when belonging to the first object group, since the upper sidelights of an oncoming passenger car characterize the dimensions of the passenger car better than if only the two headlights are recognized as first or second object 810a or 810b.

However, if the grouping of fifth object 810c is made into second object group 810d/e (for instance, if as fifth object an upper rear sidelight of a preceding passenger car was recorded), this second object group may be expanded to a broadened second object group 810d/e/c, in which further data of fifth object 810c are then embedded.

The exemplary embodiments described and shown in the figures have been selected merely as examples. Different exemplary embodiments are combinable with one another, either completely or with regard to individual features. An exemplary embodiment may also be supplemented by features of another exemplary embodiment.

Furthermore, method steps according to the present invention may be carried out repeatedly and also performed in a sequence other than the one described.

If an exemplary embodiment includes an "and/or" linkage between a first feature and a second feature, this may be understood to mean that the exemplary embodiment according to one specific embodiment has both the first feature and the second feature, and according to an additional specific embodiment, either has only the first feature or only the second feature.

What is claimed is:

1. A method comprising:
   taking, by a camera, an image of an environment of a vehicle;
   classifying objects in the image;
   based on at least two different parameters of the image, forming an object group including at least two of the classified objects;
   reading in object data representing information about the at least two classified objects;
   forming object group data from the read-in object data of the at least two classified objects; and
   transmitting the object group data as vehicle environment data to a headlight control unit of the vehicle.

2. The method as recited in claim 1, wherein the parameters represent at least one of: i) information with regard to at least one of brightness, color and sharpness of an image area, assigned to the object, of the image taken by the camera, ii) information with regard to at least one of a position, a distance, and a motion of one of the objects with regard to the camera or with regard to the second of the at least two objects, and iii) a duration of a presence of the object in images of the camera back over time.

3. The method as recited in claim 1, wherein the at least two of the classified objects includes at least three of the classified objects.

4. The method as recited in claim 1, wherein the at least two different parameters include at least three different parameters.

5. The method as recited in claim 1, wherein the object group data includes information on at least one of a position, a shape, a motion, an age, a brightness, a color, and a number of objects.

6. The method as recited in claim 1, wherein the object group data includes information of a size of an image section in which the at least two objects were detected in the image.

7. The method as recited in claim 1, further comprising:
based on at least two different parameters of the image, forming a second object group including at least two others of the classified objects;
reading in object data representing information about the at least two others of the classified objects;
forming second object group data from the read-in object data of the at least two others of the classified objects; and
transmitting the second object group data to the headlight control unit.

8. The method as recited in claim 7, wherein object data of a common one of the classified objects is used for forming both the object group data and the second object group data.

9. The method as recited in claim 1, wherein in the forming object group data step, object group data are formed which correspond to a predefined scenario about the vehicle that is known to the headlight control unit, and is ahead of the vehicle.

10. The method as recited in claim 1, wherein in the headlight control unit is situated independently of and spatially separated from a data preparation unit in its own housing, the data preparation being developed to carry out the reading step and the forming step, the object group data being transmitted via a communications bus of the vehicle.

11. The method as recited in claim 1, wherein the forming object group data step is responsive to a request signal of the headlight control unit, the request signal having information on at least one of a selection of the parameters and a situation specification.

12. The method as recited in claim 1, wherein, in the forming step, additional object group data are formed from the read-in object data of the at least two classified objects, the forming of the additional object group data taking place while using at least two additional parameters that differ from the parameters, which were provided by image data of the image taken by the camera, and in the transmitting step, the additional object group data are transmitted to the headlight control unit.

13. A control unit of a vehicle, the control unit comprising:
processing circuitry that is communicatively coupled to output of a camera system, wherein the processing circuitry is configured to:
classify objects in an image of an environment of the vehicle taken by the camera system;
based on at least two different parameters of the image, form an object group including at least two of the classified objects;
read in object data representing information about the at least two classified objects;
form object group data from the read-in object data of the at least two classified objects; and
transmit the object group data as vehicle environment data to the headlight control unit of the vehicle.

14. A non-transitory computer readable storage medium on which is stored program code, which is executable by a control unit of a vehicle and, when executed by the control unit, is configured to cause the control unit to perform a method, the method comprising:
classifying objects in an image taken by a camera;
based on at least two different parameters of the image, forming an object group including at least two of the classified objects;
reading in object data representing information about the at least two classified objects;
forming object group data from the read-in object data of the at least two classified objects; and
transmitting the object group data as vehicle environment data to the headlight control unit of the vehicle.

\* \* \* \* \*